May 15, 1956          W. L. HAND          2,745,602
AUTOMATIC AIR REGULATING CONTROL DEVICE
Filed March 16, 1955          2 Sheets-Sheet 1
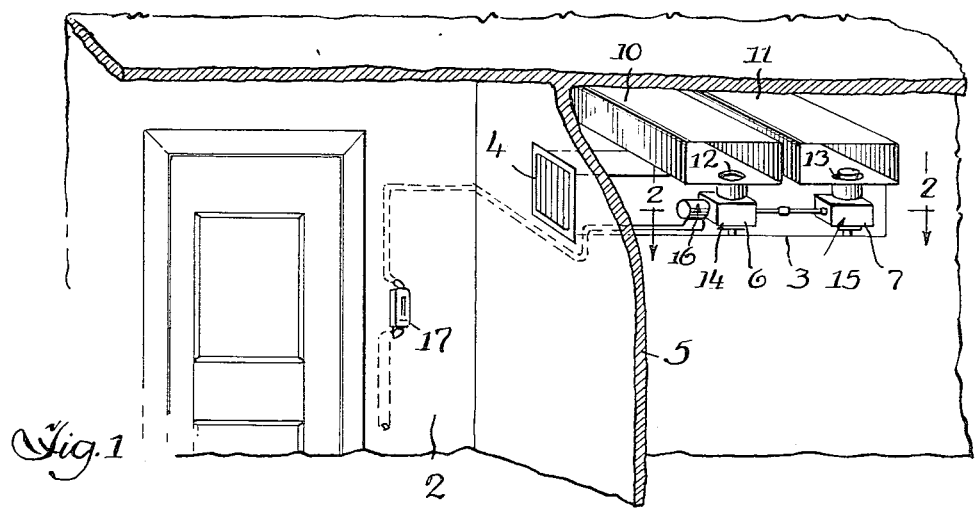
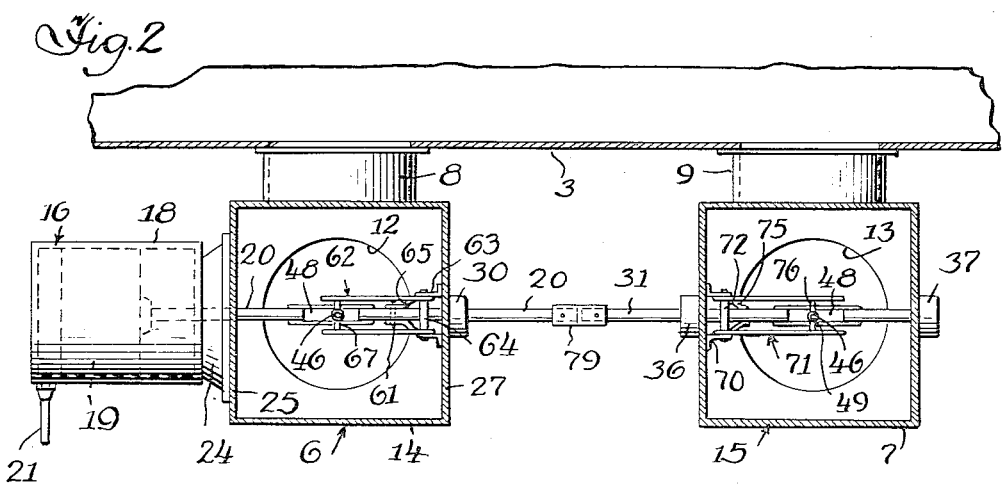
Inventor,
William L. Hand
By: Schneider & Dressler, Attys.

May 15, 1956
W. L. HAND
2,745,602
AUTOMATIC AIR REGULATING CONTROL DEVICE
Filed March 16, 1955
2 Sheets-Sheet 2
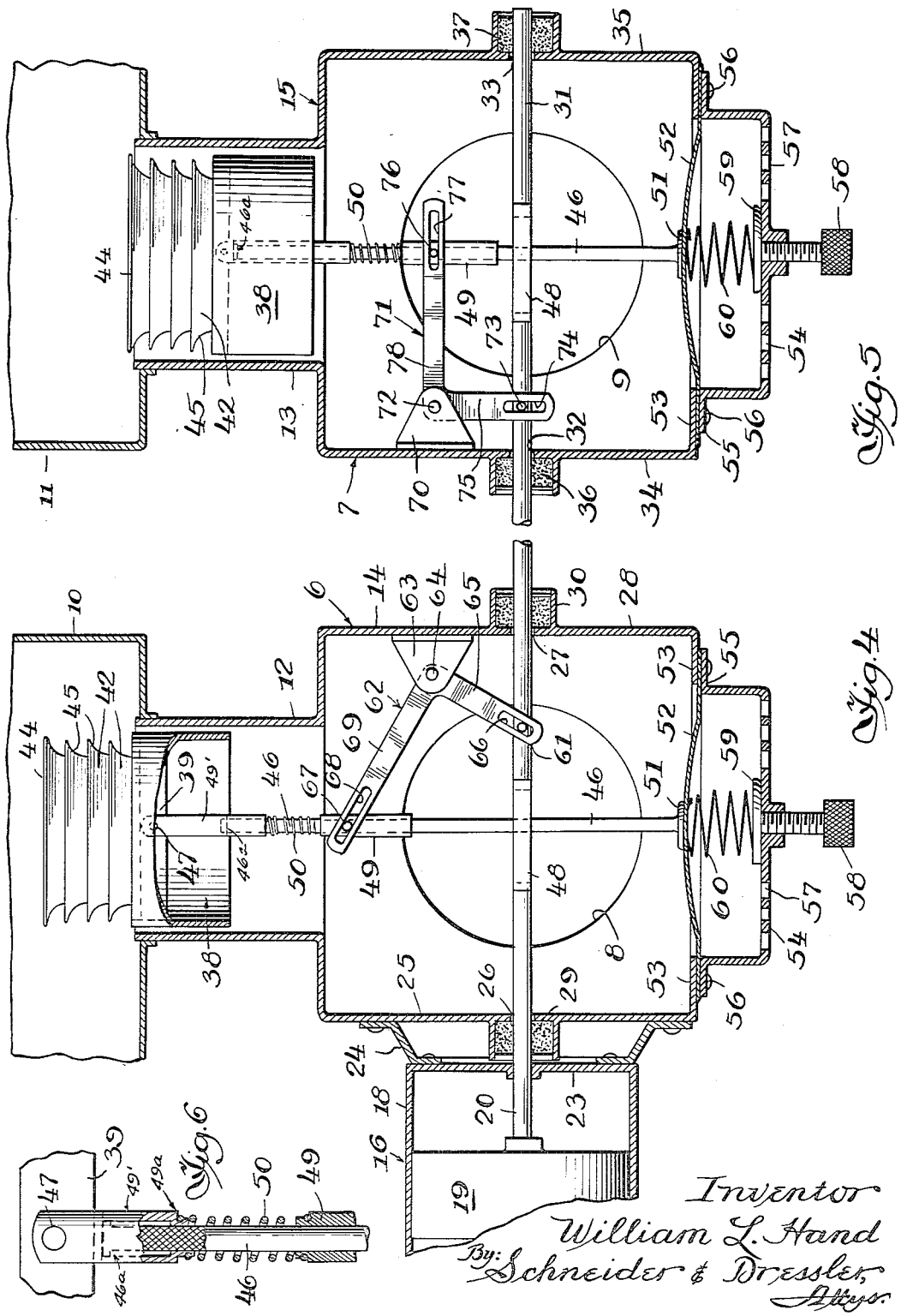
Inventor
William L. Hand
By: Schneider & Dressler,
Attys.

United States Patent Office 2,745,602
Patented May 15, 1956

2,745,602

AUTOMATIC AIR REGULATING CONTROL DEVICE

William L. Hand, Hammond, Ind.

Application March 16, 1955, Serial No. 494,779

11 Claims. (Cl. 236—13)

This invention relates to an automatic air regulating control device for intercepting and for varying the air flow from a pair of feeder ducts having warm air flowing through one and cold air flowing through the other, to maintain a constant flow of air at a predetermined temperature into a low pressure branch duct communicating with said feeder ducts through separate air interceptor control units.

The control system comprises two interceptor units, one of which enters into a warm air feeder duct and the other enters into a cold air feeder duct. Both interceptor units communicate with a low pressure branch duct leading into a room to which a constant flow of air of predetermined temperature is to be supplied. The room is provided with a thermostat adapted to control the operation of an air or electric motor. The motor operates two sets of linkages, each of which is operatively connected to an interceptor control. Each interceptor control is initially set to divert a flow of air directly from each feeder duct to the low pressure branch duct to provide a predetermined total flow.

The linkages are so arranged that the interceptor controls move simultaneously in opposite directions when the motor is operated, whereby the increase in flow diverted from one of the feeder ducts is compensated by a proportional decrease in flow diverted from the other. For example, if the thermostat is turned up, the interceptor entering into the warm air feeder duct is moved into the warm air feeder duct to increase the diversion of warm air into the low pressure branch duct, and the interceptor entering into the cold air duct is retracted a corresponding amount to decrease the diversion of cold air into the branch duct. If the temperature of the room falls below that for which the thermostat is set, the conventional operating motor is automatically started to increase the proportion of warm air diverted into the branch duct until the desired temperature is reached.

When the room temperature rises above desired temperature, the conventional operating motor is automatically reversed to operate the control device to decrease the amount of warm air diverted and increase the amount of cold air from the cold air feeder duct into the low pressure branch duct.

Each interceptor comprises a tube and a plurality of rings secured to the tube in spaced relationship to divert air from the feeder ducts by flow velocity into branches regardless of the direction of flow in the feeder ducts. The tube and rings are movable into the feeder ducts and the diversion of the flow is proportional to the distance the rings projects into each feeder duct.

The interceptor units are located outside the ducts to permit removal for inspection, repair or replacement of parts without disconnecting or cutting into the ducts, as shown, but may be mounted inside the low pressure branch duct or in any other suitable location.

The interceptor tubes are each mounted within an outer sleeve, and each tube and its rings can be withdrawn from the outer sleeve and from the interceptor housing without removing the housing.

Each interceptor unit is provided with an internal diaphragm attached to a rod extending out from the diaphragm through the center of the housing and through an outer sliding sleeve.

If the air pressure in either feeder duct increases within the feeder duct, the increased air pressure will force the diaphragm towards the adjacent outer wall of the housing and spring, retracting the center rod toward the diaphragm thereby decreasing the outer travel of sliding sleeve over the rod.

If the air pressure in either feeder duct decreases within the feeder duct the decrease in air pressure will allow the spring on the atmosphere side to force the diaphragm into and toward the center of the housing, thereby extending the rod through the sliding sleeve permitting a longer travel of the sliding sleeve over the diaphragm rod.

An outside adjustment screw is provided for each interceptor unit to increase or decrease the spring pressure against the internal diaphragm and thereby regulate the volume of air supplied to the branch duct at various air pressures. A change in the spring pressure against the diaphragm changes the initial position of the diaphragm and changes the required air pressure to operate the diaphragm. The adjustment screws are accessible from outside the interceptor units.

The interceptor units may be operated by separate motors synchronized to move the interceptor tubes in opposite directions simultaneously, but it is preferred to operate both units by a single motor. The motor may be either air or electric and is preferably controlled by a thermostat.

The regulated control is attained by providing interceptor rings and tube movable and adjustable into and out of the flow path within the feeder ducts. This includes the interceptor rings and tube attached to a bell crank attached by rod to an air, electric or hydraulic operating motor controlled by a room temperature thermostat. The interceptor rings and tube are additionally operated independent of motor and temperature operation by an internal diaphragm controlled by the air pressure within the feeder ducts.

The structure by which the above mentioned and other advantages of the invention are attained will be described in the following specification, taken in conjunction with the accompaying drawings, showing a preferred illustrative embodiment of the invention in which:

Figure 1 is a diagrammatic view of the air control system embodying the invention as installed for use in a multi-room building.

Fig. 2 is a cross sectional view, taken along the line 2—2 of Fig. 1;

Fig. 3 is a fragmentary cross sectional view of the interceptor rings;

Fig. 4 is a cross sectional view through an interceptor unit and showing the operating mechanism;

Fig. 5 is a view, similar to Fig. 4, showing another interceptor unit adapted to be connected to the operating mechanism of Fig. 4 with its linkage reversed relative to that of Fig. 4;

Fig. 6 is a detail cross sectional view showing the rod connected to the interceptor tube; and Fig. 7 is a fragmentary cross sectional view showing a sylphon arrangement that may be substituted for the diaphragm.

Referring to Fig. 1 of the drawings, the room to be air conditioned and ventilated is indicated by reference numeral 2. A low pressure branch duct 3 discharges a flow of air into room 2 through a grill 4 in wall 5. A pair of interceptor control units 6 and 7 mounted adjacent one side of duct 3 communicate therewith through outlets 8 and 9 (Fig. 2). The interceptor units also communicate with and enter into the two separate feeder ducts 10 and 11 by means of necks 12 and 13 extending from control housings 14 and 15 of control units 6 and 7, respectively. It will be obvious that the specific direction of outlets 8 and 9 and necks 12 and 13 depends upon the positions of duct 3 relative to ducts 10 and 11. A motor 16 mounted at one side of housing 14 is controlled in conventional manner by a thermostat 17 mounted on one wall of room 2.

Motor 16 may be an air or an electric motor, but in the embodiment of Figs. 1 to 6 is shown as an air motor comprising a cylinder 18 and a piston 19 slidably mounted therein. A piston rod 20 is secured at one end to one side of the piston. The cylinder is provided with air line 21 from a room thermostat 17. One end wall 23 is secured to an annular flange 24 which is secured to wall 25 of housing 14.

Rod 20 extends through an aperture 26 in wall 25 and through a similar aperture 27 in wall 28. Packing 29 is secured adjacent aperture 26, and packing 30 is secured adjacent aperture 27. Housing 15 is essentially a duplicate of housing 14, and a rod 31, similar to and coupled to rod 20 in axial alignment therewith, extends through apertures 32 and 33 of walls 34 and 35, respectively. Packing 36 is secured adjacent aperture 32, and packing 37 is secured adjacent aperture 33.

Interceptor units 6 and 7 are duplicates, except for the linkage hereinafter described, and a description of one will suffice for both units, the same reference numerals being used to indicate identical structure.

An interceptor tube 38 is slidably mounted in each neck 12 and 13. A bar 39 extends across the center of tube 38 adjacent its outer end and is secured at its ends to the tube. A metal strip 40, secured at one end to each end portion of bar 39 extends outwardly from bar 39 along inside diameter of rings 42 each secured to bar 40 at 41. The rings are concentric with tube 38. The outer end of strip 40 is bent to form a flange 43 to which a flat plate 44 is secured. Plate 44 is positioned adjacent the outer end of outermost ring 42 and forms a cover therefor. The rings are of thin metal and each is curved inwardly towards the center, as indicated at 45, to deflect air from the flow within feeder ducts 10 or 11 through tube 38 into housing 14 or 15. Tube 38 is movable axially within neck 12 or 13 to project rings 42 into feeder duct 10 or 11 and to retract them therefrom. The tube and rings are movable at right angles to the flow path in feeder ducts 10 and 11 and the volume of air diverted from each duct depends upon the distance the rings are extended into the duct. As each interceptor ring is retracted into neck 12 or 13 it is substantially closed, and when all the rings are retracted the interceptor is substantially closed.

The extension and retraction of interceptor rings 42 are controlled by a pair of sleeves 49 and 49' sliding over a rod 46 which extends through housing 14 or 15. Rod 46 is disposed centrally of the housing, and the central portions of rods 20 and 31 are divided in any suitable manner, as indicated at 48, to provide clearance permitting rods 20 and 31 to reciprocate longitudinally without touching rod 46. The outer end of sleeve 49' is secured to bar 39, as indicated at 47. A compression spring 50 encircling rod 46 has one end secured to the upper portion of sleeve 49 and the other end secured to the lower portion of sleeve 49'.

The upper end of rod 46 is provided with a laterally extending flange 46a which fits slidably within sleeve 49'. The lower end of sleeve 49' is provided with an inwardly extending flange having a shoulder 49a against which flange 46a abuts when in its lowermost normal position. Under abnormally high pressure conditions flange 46a may retract sleeve 49' and tube 38 to which it is secured.

The lower end of rod 46 is provided with an enlarged disk 51 which is secured to a diaphragm 52 of neoprene coated nylon cloth or similar fabric. The wall of housing 14 or 15 against which diaphragm 52 is secured comprises an annular flange 53 leaving a large central aperture across which the diaphragm extends. The edges of the diaphragm engage the outer surface of flange 53 and are secured thereagainst by a box cover member 54 having a flange 55 which overlies flange 53 and is secured thereto by screws 56 with the edges of diaphragm 52 interposed between flanges 53 and 56. Diaphragm 52 may be readily removed and replaced by removing screws 56 and cover 54. Cover member 54 is perforated, as indicated at 57, so that diaphragm 52 is always under atmospheric pressure on its outer surface.

An adjusting screw 58 is threaded through an aperture in cover member 54. A disk 59 is secured to the end of screw 58 within cover member 54, and a compression spring 60 aligned vertically with disks 51 and 59 has one end bearing against disk 59 and its other end bearing against diaphragm 52 directly adjacent disk 51. Rotation of screw 58 exerting pressure on spring 60 cooperating with the atmospheric pressure increases the amount of air pressure required to operate the internal diaphragm 52 to withdraw rod 46 with end flange 46a retracting within sleeve 49'. Rotation of screw 58 in the opposite direction decreases the amount of air pressure required to operate diaphragm 52 to extend rod 46. Since the axial movement of rod 46 in response to rotation of screw 58 is independent of any movement of rods 20 or 31, there is no change in the diversion of air through the other interceptor unit.

The atmospheric pressure on one side of the diaphragm and the pressure of the air diverted from the feeder duct on the opposite side normally keep the diaphragm in the position in which it is initially adjusted for the initial pressure. An increase in pressure of the diverted air will force the diaphragm towards the adjacent outer wall of the box cover 54 against the action of spring 60, and will retract rod 46 towards the diaphragm, thereby retracting the flange 46a within sleeve 49' contacting stop 49a for a shorter axial travel of sleeve 49' over rod 46 to decrease the diverted flow of air proportionally to the increase of pressure in the feeder duct. A decrease in the pressure of the air in the feeder duct will relieve the pressure against one side of the diaphragm, and spring 60 will move the diaphagram and rod 46 towards the feeder duct, thereby extending flange 46a within sleeve 49' for a longer axial travel of sleeve 49' over rod 46 to increase the diversion of air therefrom proportionally to the decrease of pressure independently of movement of sleeve 49. Thus, it will be seen that the volume of air diverted from each feeder duct does not change in response to any change of pressure of the air in either duct.

In order to provide for a proportional decrease in air diversion from either feeder duct 10 or 11 when the diversion from the other is increased in normal operation of the interceptor control units, it is necessary to have linkages connected to rods 20 and 31 operate simultaneously in opposite directions. As shown in Fig. 4, rod 20 has a pin 61 projecting therefrom to the right of rod 46. A bell crank 62 is pivoted to an ear 63 projecting inwardly from wall 28 on the right side of housing 14, as indicated at 64. One arm 65 of bell crank 62 is provided adjacent one end with an elongated slot 66 into which pin 61 projects. Sleeve 49 has a pin 67 projecting into an elongated slot 68 in the other arm 69 of bell crank 62.

Any temperature change in room 2, or any adjustment in thermostat 17 which causes a variation between the actual temperature of the room and the temperature for which the thermostat is set, automatically moves piston 19 to thereby move rods 20 and 31 axially in the same direction. Axial movement of rod 20 moves bell crank 62 pivotally and thereby moves sleeve 49 vertically, to push tube 38 towards duct 10 or to retract it therefrom, thereby either increasing or decreasing the diversion of air from duct 10 into low pressure branch duct 3.

Housing 15 has an ear 70 projecting inwardly from its left wall 34, and a bell crank 71 is pivoted thereto, as indicated at 72. Rod 31 has a pin 73 projecting into an elongated slot 74 in one arm 75, and sleeve 49 has a pin 76 projecting into an elongated slot 77 in the other arm 78 of bell crank 71. Since bell crank 71 is on the opposite side of rod 46, relative to the position of bell crank 62, the direction of movement of interceptor tube 38 and rings 42 in interceptor unit 7 is opposite the movement of these parts in unit 6. As shown in Fig. 2, rods 20 and 31 are coupled with a flexible coupling at 79 so that the movements of the rods are simultaneous.

As shown in Fig. 7, diaphragm 52 may be replaced by a sylphon 80 secured to cover member 54 in the same manner as the diaphragm is secured. The sylphon has a spring action that eliminates the necessity of a spring similar to spring 60. The disk 51 at the bottom of rod 46 is secured to the top of sylphon 80 and the operation is the same as previously described.

While I have described a few preferred embodiments of my invention in detail, it will be understood that the description thereof is illustrative rather than restrictive, as many details may be modified or changed without departing from the spirit or scope of my invention. Accordingly, I do not desire to be restricted to the exact structure described.

I claim:

1. In an air control system, a pair of separate feeder ducts, a low pressure branch duct, a pair of interceptor units each communicating with said branch duct and with one of said feeder ducts, each of said units comprising a tube with a connected set of rings movable transversely into the flow of air in one of said feeder ducts, each of said rings being curved inwardly to deflect and turn air from the feeder duct in which it is positioned into said low pressure branch duct, and means for moving each of said sets of tube and rings transversely of its feeder duct to vary the volume of air deflected from each of said feeder ducts.

2. In an air control system, a pair of separate feeder ducts, a low pressure branch duct, a pair of interceptor units each communicating with said low pressure branch duct and with one of said feeder ducts, each of said units comprising a tube and a set of rings positioned beyond one end of said tube and connected thereto, each of said tubes being movable transversely inside of one of said feeder ducts to move its rings transversely of the flow of air in said one feeder duct, each of said rings being curved inwardly to deflect air from the feeder duct in which it is positioned through its tube and into said low pressure branch duct, and means for moving each of said sets of rings transversely of its feeder duct to vary the volume of air deflected from each of said feeder ducts.

3. In an air control system, a pair of separate feeder ducts, a low pressure branch duct, a pair of interceptor units each communicating with said branch duct and with one of said feeder ducts, each of said units comprising a connected set of rings movable transversely into the flow of air in one of said feeder ducts, each of said rings being curved inwardly to deflect and turn the air from the feeder duct in which it is positioned into said low pressure branch duct, and means for simultaneously moving each of said sets of rings in opposite directions transversely of said respective feeder ducts to vary the proportional amount of air deflected from each feeder duct into said branch duct while the total volume of air deflected into said branch duct remains constant.

4. An automatic air control system comprising a warm air feeder duct, a cold air feeder duct, a low pressure branch duct communicating with each of said feeder ducts through separate interceptor units, each of said interceptor units including a tube and a set of rings movable into and retractible from one of said feeder ducts, said rings being curved inwardly to deflect and turn air from said feeder ducts through said tubes and rings, and means for simultaneously moving the tube and rings of each interceptor unit in opposite directions transversely relative to said feeder ducts to maintain a constant total volume of air diversion from said feeder ducts into said branch duct.

5. An automatic air control system comprising a warm air feeder duct, a cold air feeder duct, a branch duct communicating with each of said feeder ducts through separate interceptor units, each of said interceptor units including a tube and a set of rings movable into and retractible from one of said feeder ducts, said rings being curved inwardly to deflect and turn air from said feeder ducts through said tubes, and a thermostatically controlled motor for automatically moving the tube and rings of each interceptor unit simultaneously in opposite directions transversely relative to said feeder ducts upon variations between the thermostat setting and the temperature of room in which the thermostat is located to increase the diversion of air from one of said ducts and proportionally decrease the diversion of air from said other duct to maintain the total air diverted from said feeder ducts at a constant volume and to regulate the air temperature in the room in which the thermostat is located.

6. An automatic air control system comprising a warm air feeder duct, a cold air feeder duct, a low pressure branch duct communicating with each of said feeder ducts through separate interceptor units, each of said interceptor units including a tube and a set of rings movable into and retractible from one of said feeder ducts, said rings being curved inwardly to deflect and turn air from said feeder ducts through said tubes, a motor adapted to be controlled by a thermostat located in a room to be ventilated, a rod operatively connected to said motor and extending through each of said interceptor units, said rod being adapted to be moved axially by said motor, and separate linkages mounted in each of said interceptor units, each of said linkages being operatively connected to said rod and to one of said tubes, whereby said tubes and rings are adapted to be moved simultaneously in opposite directions transversely of said feeder ducts upon axial movement of said rod to increase the diversion of air from one of said feeder ducts into said branch duct and to decrease the diversion of air from said other feeder duct proportionally, to thereby regulate the temperature of air flowing through said branch duct while maintaining its volume constant.

7. An automatic air control system comprising a warm air feeder duct, a cold air feeder duct, a low pressure branch duct communicating with each of said feeder ducts through separate interceptor units, each of said interceptor units including a tube and a set of rings movable into and retractible from one of said feeder ducts, said rings being curved inwardly to deflect and turn air from said feeder ducts through said tubes, means for independently moving said tube and thereby changing the position of either of said tubes relative to its feeder duct independently of the position of the tube of said other interceptor unit, a motor adapted to be controlled by a thermostat located in a room to be ventilated, a rod operatively connected to said motor and extending through each of said interceptor units, said rod being adapted to be moved axially by said motor, a second rod mounted in each of said interceptor units at right angles to said first mentioned rod, a sleeve slidably mounted on each of said last mentioned rods, each of said sleeves being secured at one end to one of said interceptor tubes, and separate linkages mounted in each of said interceptor units, each of said linkages being operatively connected to said first mentioned rod and to one of said sliding sleeves, whereby each of said tubes, and its set of rings, are adapted to be moved simultaneously in opposite directions transversely of said feeder ducts upon axial movement of said first mentioned rod to increase the diversion of air from one of said feeder ducts into said branch duct and to decrease the diversion of air from said other feeder duct proportionally to regulate the temperature of air flowing through said branch duct while maintaining its volume constant.

8. In an air control system, a pair of separate feeder ducts, a low pressure branch duct, a pair of interceptor units each communicating with said branch duct and with one of said feeder ducts, each of said units comprising a tube and a connected set of rings movable transversely into the flow of air in one of said feeder ducts, each of said rings being curved inwardly to deflect air from the feeder duct in which it is positioned into said branch duct, means for simultaneously moving each of said tubes and set of rings in opposite directions transversely of said respective feeder ducts to vary the proportional amount of air deflected from each feeder duct into said branch duct while the total volume of air deflected and turned into said branch duct remains constant.

9. In an air control system, a feeder duct, a low pressure branch duct, and an interceptor unit communicating with both of said ducts, said interceptor unit comprising a housing, a tube and connected set of rings movable through an aperture in one wall of said housing transversely into and out of said feeder duct, said rings being curved inwardly to deflect air from said feeder duct through said tube, a sleeve operatively connected at one end to said tube, a rod passing through said sleeve, a spring pressed diaphragm in said housing, said diaphragm engaging one end of said rod, and manually operated means for moving said spring and diaphragm to change the end position of said rod passing through said sleeve.

10. In an air control system, an air duct, a housing communicating with said duct, an interceptor slidably mounted in said housing, said interceptor comprising a tube and set of rings which are movable transversely into and out of said feeder duct, a diaphragm mounted in said housing, a spring urging said diaphragm towards said interceptor, said housing having a box wall on one side of said diaphragm perforated to subject said side of said diaphragm to atmospheric pressure, a rod operatively provided with an enlarged disc secured to the diaphragm, said rod extending through the center of said housing, and a spring cooperating with the atmospheric pressure on one side of said diaphragm and the pressure of air from said feeder duct on the other side of said diaphragm to hold said diaphragm and rod in fixed position, said spring and said diaphragm moving against said rod to move said rod when the pressure of air in said feeder duct decreases, and said spring and diaphragm moving said rod in the opposite direction when the pressure of air in said feeder duct increases.

11. In an air control system, an air duct, an interceptor unit comprising a housing having an open neck communicating with an opening in said duct, a tube slidable in said neck, a set of rings positioned beyond the outer end of said tube and connected thereto, each of said rings being curved inwardly to deflect air flowing in any direction in said feeder duct, and means for moving said rings transversely in the flow of air in said air duct.

References Cited in the file of this patent

UNITED STATES PATENTS

| | | |
|---|---|---|
| 1,996,098 | Chase | Apr. 2, 1935 |
| 2,671,395 | De Muth | Mar. 9, 1954 |
| 2,705,595 | Carlson | Apr. 5, 1955 |